United States Patent [19]

Edenwall et al.

[11] 4,087,274
[45] May 2, 1978

[54] METHOD OF PRODUCING A PARTIALLY REDUCED PRODUCT FROM FINELY-DIVIDED METAL SULPHIDES

[75] Inventors: Ingvar A. O. Edenwall; Douglas Sewerin Ekman; Hans I. Elvander, all of Helsingborg; Karl Göran Görling, Lidingo; Carl Johan Sigvard Hellestam; Karl-Axel Melkersson, both of Helsingborg, all of Sweden

[73] Assignee: Boliden Aktiebolag, Stockholm, Sweden

[21] Appl. No.: 700,031

[22] Filed: Jun. 25, 1976

[30] Foreign Application Priority Data

Jul. 4, 1975   Sweden ............................... 7507696
Apr. 6, 1976   Sweden ............................... 7604046

[51] Int. Cl.² ............................................. C22B 4/00
[52] U.S. Cl. ................................. 75/10 R; 75/1 R; 75/31; 75/91; 75/93 R
[58] Field of Search ............. 75/1 R, 1 T, 3, 4, 5, 75/31, 40, 41, 42, 62, 63, 77, 78, 89, 93 R, 91.10 R, 38

[56] References Cited

U.S. PATENT DOCUMENTS

| 2,503,555 | 4/1950 | Lykken | 75/38 |
| 2,784,077 | 3/1957 | Greenwalt | 75/92 |
| 2,846,302 | 8/1958 | Greenwalt | 75/92 |
| 3,145,094 | 8/1964 | Nakajima | 75/38 |
| 3,350,195 | 10/1967 | Mills | 75/1 R |
| 3,607,217 | 9/1971 | Metrailer | 75/4 |

*Primary Examiner*—R. Dean
*Assistant Examiner*—Michael L. Lewis
*Attorney, Agent, or Firm*—Stevens, Davis, Miller & Mosher

[57] ABSTRACT

There is provided a method of producing a partially reduced product from finely divided metal oxide containing material. The product is suited for continued reduction and the material containing the metal oxide may be an ore concentrate or an oxidic intermediate product. The material is charged to the top of a metallurgic shaft and is contacted during its fall through the shaft with hot gases of combustion, so as to melt said material. At the same time, a carbonaceous or carbon-containing reductant is charged to the furnace, such that said molten material is converted into a partially reduced product containing solid carbon material.

24 Claims, 3 Drawing Figures

METHOD OF PRODUCING A PARTIALLY REDUCED PRODUCT FROM FINELY-DIVIDED METAL SULPHIDES

The present invention relates to a method of producing a partially reduced product which is suited for continued reduction treatment from finely-divided metal oxide containing material, such as ore concentrates or oxidic intermediate products.

In accordance with the majority of conventional metal recovering processes, prior to being subjected to reduction treatment, finely divided oxidic material must be converted to lump form by means of an agglomerating process. Normally this agglomerating process has the form of a travelling-grate sintering or pellet-sintering operation, although in recent times pellets have been formed by means of cold-bound (chemically bound) pelletizing processes. Briquetting has also been applied and has been found particularly suitable in those cases when it is desired to obtain an agglomerate containing a reduction agent.

It has even been suggested to reduce oxidic finely divided material before agglomerating the material.

Thus, in the U.S. Pat. No. 3,607,217 it is proposed a method, wherein finely divided iron oxide containing raw material in a first stage is partially reduced in a fluidized bed reactor, whereafter the finely divided partially reduced material is introduced together with heavy liquid hydrocarbons into a second fluidized bed reactor, in which agglomerates containing partially reduced iron oxide and coke are formed, said coke originating from said hydrocarbon and serving as a binding agent between the fine particles of reduced iron oxide.

Prior to the occurence of the aforementioned, modern methods of agglomeration, developments in this respect were directed towards different forms of sintering in a flame or flash sintering. The basic principle of the proposed and tested flash sintering methods have resided in causing the finely divided oxidic material to fall through a vertically extending generally cylindrical reaction chamber, for example in the form of a stock or a shaft, in contact with hot combustion gases, said material being heated to a temperature of such magnitude that there is formed at the bottom of the shaft a sintered mass or a melt of oxides. The treated material is cooled and discharged from the shaft in a number of different ways. Examples of the manner in which such cooling and discharge can be effected are found in the U.S. Pat. Nos. 806,774, 865,658, 1,812,397 and 1,930,010, and the Swedish Patent Specifications Nos. 68,228 and 90,903.

Flash sintering is an interesting process from several aspects, of which can be mentioned:
- no pre-treatment of the material is necessary; materials having a normal moisture content need not be dried,
- in principle the method can be readily carried out and the costs entailed with regard to the apparatus required are low,
- a high production can be obtained, even with apparatus of relatively moderate dimensions,
- the material can be partially reduced to a certain extent,
- any sulfur and arsenic which the oxide may contain is expelled to a large extent, and it is also possible to expel zinc to a certain extent.

Despite these advantages, flash sintering has not hitherto been applied to a wide extent. There are several reasons why this is so, of which reasons it can be mentioned that:
- molten oxide has attacked the brick lining of the shaft; this problem can be overcome, however, by cooling the shaft such that the walls thereof become encrusted with frozen material,
- owing to the difficulty of controlling the process, the sinter readily obtains a consistancy of such compactness that it is difficult to reduce the material in a continued treatment process,
- serious mechanical problems are encountered when discharging such a compact sinter from the bottom of the shaft, which sinter when cooled is liable to obtain a pseudo-monolithic character, i.e. although sintered it behaves like a monolith.

It has now been found possible to solve these problems in a surprisingly simple manner when carrying out a sintering process of the type mentioned in the introduction, in which process the metal oxide containing material is caused to melt whilst falling downwardly through a shaft by contacting said material with hot combustion gases whilst supplying carbonaceous or carbon-containing reduction agent to the shaft, if, in accordance with the present invention, the molten metal oxide containing material in the lower portion of the shaft whilst being partially reduced in contact with the supplied reduction agent, is converted to a partially reduced product containing solid carbon material.

It is also within the scope of the invention to wholly or partially utilize sulphidic raw materials for the production of a partially reduced product. According to the invention there is provided a method, wherein at least part of the metal oxide containing material is produced by roasting finely-divided metal sulphide material in a zone in the shaft, located above the portion thereof — the reducing zone — in which the metal oxide containing material is partially reduced. Thus, there is provided a pre-treatment method which is particularly advantageous for the subsequent recovery of metal from the metal sulphide material, since no separate apparatus for roasting the metal sulphide material to metal oxide material is required, and since heat formed during the roasting of the sulphide-bound sulphur is utilized for the melting of the metal oxide material.

The carbonaceous or carbon-containing reduction agent is supplied to the shaft preferably below the optional zone in which the metal sulphide material is roasted, which agent may comprise a material capable of forming coke when heated, or may comprise coke produced externally of the shaft. Said carbonaceous or carbon containing reduction agent may thus comprise an organic product, such as hard coal or stone coal, lignite, peat etc., which is converted to coke in the shaft whilst giving off combustible gases.

The aforementioned reduction agent can be charged to the upper portion of the reducing zone in which reduction takes place and be pre-heated and optionally converted to coke during its passage downwardly through said zone. In certain cases, however, the reduction agent may be charged to the shaft further down in said zone in which the reduction takes place, or may even be charged to a reactor connected to the lower portion of the shaft, in which reactor final reduction and melting of the sinter takes place.

In accordance with a preferred embodiment, the reduction agent is supplied to the shaft together with a carrier gas which can be oxidizing to a greater or smaller extent and which can be pre-heated. The streams of gas exiting from the supply nozzles are directed so that a vortex having a substantially vertical axis is formed in the reducing zone, wherewith a more intensive reaction between molten oxide and gas is caused and the reduction agent is spread over the cross-sectional area of the shaft in a desirable manner. The vortex is conveniently created by directing the gas streams from the supply nozzles obliquely downwardly and, at the same time, tangentially to an imaginary horizontal circle the diameter of which is smaller than the smallest cross-section dimension of the shaft.

In accordance with a further embodiment metal sulphide containing material is charged to the top of the shaft, and an obtionally pre-heated gas for combusting or roasting purposes is also charged to the roasting zone of the shaft. This gas may contain from 20 to 100% by volume of free oxygen, but may also comprise totally or partially water vapour when it is desired to obtain, during the roasting operation, a roaster gas from which elementary sulphur is to be recovered, for example in accordance with a Claus-process.

During its passage through the roasting zone, the metal sulphide containing material is subjected to a roasting process during which sulphide-bound sulphur is roasted off and the metal oxidized either totally or partially.

The hot gases used to melt the metal oxide containing material may be produced by the combustion of solid, liquid or gaseous fuel and/or by the partial combustion of the carbonaceous or carbon containing reduction agent. For the combustion of the fuel and/or the reduction agent there can be used an oxidizing gas containing 20–100% by volume free oxygen. For the purpose of saving fuel, said gas can be pre-heated, suitably by using exhaust gas heat of low grade from the process.

The reduction agent and the molten oxide react together in the lower portion of the shaft to partially reduce the oxide and to form substantially carbon monoxide. With the majority of metal oxides, for example with respect to iron, this reaction requires heat. Consequently, the metal oxide containing molten material is converted during the partial reduction of said material to a semi-molten state, and finally to a sintered solid product.

During the continued reduction of the material in its semi-molten state, the gas developed causes the sinter to obtain a porous character, and seemingly a blister-structure.

The reducing gas formed upon the partial reduction of oxide in the shaft, together with reducing gas which may have been formed in the optional final reduction and smelting reactor upon the optional coking of carbonaceous or carbon containing reduction agent and upon partial combustion of reduction agent with oxidizing carrier gas, may be totally or partially combusted in the shaft by supplying oxidizing gas to suitable portions thereof.

It is usually desirable that the product is reduced to a comparatively high degree. Such a comparatively high degree of reduction can be achieved in accordance with the invention by distributing the supply of the oxidizing gas over the height of the shaft, so that the conditions in the upper portion of the shaft are more oxidizing, while the conditions in the lower part of said shaft are more reducing, whereby the metal oxide containing material is partially reduced to a certain extent during its fall through the shaft. A corresponding effect can also be achieved in accordance with the invention, by supplying reduction agent and optionally fuel together with part of the gas maintaining the combustion process to the lower portion of the shaft, said part being adjusted so as to create reducing conditions in this portion of said shaft.

In those cases metal sulphide containing materials are charged into and roasted in the shaft, as described above, the energy developed during the roasting process is often sufficient to melt the roasted product. Irrespective of whether melting takes place or not, reducing gas from the underlying reducing zone can be combusted in the roasting zone by supplying oxidizing gas thereto, wherewith the energy thus developed can be utilized for finally melting and/or superheating the roasted product. It also lies within the scope of the invention to completely or partially combust the reducing gas in the shaft beneath the roasting zone. This latter procedure is particularly favourable when a roaster gas rich in sulphur is desired, wherewith at least the major portion of the combusted gas can be removed, to advantage, from the shaft beneath the roasting zone.

The roaster gases are removed from the process, optionally together with combusted gas, suitably from the top of the shaft. To this end, the upper portion of the shaft is preferably formed so that the roasted product is separated from the gas mass by cyclone action. This can be achieved by arranging the supply nozzles for metal sulphide and gas for roasting peripherally around the top of the shaft, said nozzles being directed obliquely downwardly and placed laterally so that the streams touch the periphery of a circle whose diameter is smaller than the smallest cross-dimension of the shaft. Those particles of material which are not thrown directly down into the reducing zone of the shaft will, in this way, be collected at the wall of the shaft in the upper portion thereof and will move along said wall down to the reducing zone. The cyclone effect is amplified if the gas mass from the reducing zone in accordance with the aforegoing is imparted a rotary motion, and if the oxidizing gas, which in accordance with the afore-going is supplied to the shaft is also permitted to amplify said rotary motion by being blown tangentially into the shaft, for example, in the manner described above with respect to the supply nozzles.

The metal sulphide and/or metal oxide containing material and/or the carbonaceous or carbon containing reduction agent is suitably injected to the shaft utilizing oxidizing gas as a carrier gas.

The supply of carbonaceous or carbon containing reduction agent may be adapted so that the amount of carbon material in the partially reduced product is at least sufficient for the final reduction of the metal oxide containing material in said product. In this way, the sintered product becomes brittle and the grains of coke in the product constitute fracture lines. In conjunction with the aforementioned porous nature of the sintered product, this formation of fracture lines enables said product, when practising the method of the invention, to be discharged from the shaft without creating difficulties of a mechanical nature.

Furthermore, the product obtains properties which are particularly suitable for the continued working of said product, these properties being that:
the high porosity enables the product to be readily reduced,
the amount of coke in the product can be adapted for direct smelting in electric-type or blast-type low shaft furnaces; in order to save coke, the agglomerates for such furnaces have previously been produced by briquetting, using a simple hard-coal and binding agents, whereafter the briquettes are normally coked, since the flash sintered product obtains a considerable degree of reduction, less energy is required for the subsequent smelting operation, this being particularly important from an economic aspect when smelting is effected electrically.

It can be mentioned that one important advantage afforded by the method according to the invention resides in the fact that a reduction agent, such as low-grade coal which is not qualitatively suitable for use as a starting material for metallurgical coke, can be used without detriment. There are plentiful natural resources of low-grade coal, in contradistinction to coal suitable for metallurgical purposes, of which latter type of coal it is expected that there will be a serious shortage in the near future.

As previously mentioned, the partially reduced, solid carbon containing product can be continuously discharged mechanically from the lower portion of the shaft in a manner known per se and subsequently finally reduced and melted in a reactor separate from the shaft. It has been found particularly advantageous, however, to connect directly to the lower portion of the shaft a reactor for the final reduction and melting of the product whilst supplying energy to said reactor.

A number of methods have been suggested for producing metals, particularly iron, from oxides directly in a shaft, by melting and reducing said oxides in a flame. Examples of these methods are found in the U.S. Pat. Nos. 774,930, 817,414, 1,847,527, 1,904,683 and 2,630,309, the Canadian Patent Specification No. 864,451, the Swedish Patent Specification No. 206,113 and the German Offenlegungsschrift No. 2,351,374. The difficulties encountered in so far practical tests have been carried out in accordance with the aforementioned methods have resided in the fact that firstly it is difficult to reduce the material to a sufficient extent, even when the gas is permitted to leave the shaft uncombusted and at a high reduction potential, and secondly because of the high degree of attack on the brick lining of the shaft, which lining with respect to the heat balance of the autogenous process, should not be cooled. The amount of heat consumed by the process is also high owing to the fact that the chemical heat content of the exhaust gases is not fully utilized. Thus, in the above mentioned U.S. Pat. No. 1,847,527 there is suggested reduction of finely divided oxidic ore in a shaft, partly by means of a vertical electric arc as a heating source, and a subsequent smelting and final reduction of reduced or partially reduced ore which is collected on the hearth of a horizontal smelting chamber. The smelting chamber is heated by means of an electric arc and reducing gas from the shaft is combusted in said chamber by supplying air thereto, whereby an oxidizing atmosphere is obtained in said chamber, which atmosphere creates i.a. risks of re-oxidation of formed metal and risks of a non-desired slagging of metal.

Difficulties of aforementioned type are overcome by the method according to the invention, owing to the fact that the shaft is provided with cooled walls which are constantly covered with material frozen thereto, this cooling preferably being effected by vapourizing water under pressure the gases are combusted, preferably completely, before they leave the shaft the requirement of a practically complete reduction of the metal oxides is neglected.

Even though the material in the partial reduction process is not reduced to any great extent, e.g. in the case of iron oxide no further than the FeO stage, when the reactor is connected directly to the bottom portion of the shaft, only a relatively small amount of energy is required to effect the final reduction of the oxides and the melting of the slag and the metal obtained by the reduction; this because of the melting of the metal oxide material and the extent to which the molten oxide is superheated during its passage through the shaft. Advantageously coking of the reduction agent and heating of the formed coke is effected in the shaft, together with the calcination and heating of optionally supplied flux. Furthermore, the radiation from the flame in the shaft against the surface of the charge in the lower portion thereof contributes to covering the aforementioned energy requirements.

A particular advantage is gained when the energy required for the final reduction process is supplied to the reactor electro-inductively. The method described in Swedish Patent Specifications 7306063-4 and 7306064-2 can be used for this purpose. The method according to the invention, however, is not restricted to the frequency range of the a.c. current in the induction coil disclosed in these patents.

Another method of supplying the reactor with the requisite heat involves the burning of excess carbon in the partially reduced product. An arrangement similar, for example, to that used with conventional blast-furnace processes can be used in this respect. This means that a number of tuyeres are placed around the periphery of the reactor at a suitable height above its bottom and a blast, which comprises air is charged to the reactor through the tuyeres, said blast preferably being enriched with oxygen and preferably being pre-heated. Optionally solid, liquid or gaseous fuel can be charged to the reactor simultaneously as the air blast, in order to cover the energy requirements and even to control the oxygen potential to a desired level, for example a level at which reduction and fuming of any zinc present would be ensured.

The use of so-called plasma burners is an example of one way in which the reactor can be supplied with sufficient energy in accordance with the invention.

According to the invention it is further possible and advantageous when producing a molten finally reduced product and when a lime-containing slag former is charged during the reduction, to utilize part of the physical heat contained by the tapped molten slag. Said slag former is then produced from part of the tapped molten slag and unburnt limestone-containing solid material, which material is at least partially burnt by bringing it into contact with said part of said slag. By utilizing the heat content of the tapped slag in such a rational manner, an effective slag former can be obtained from inexpensive raw material whilst utilizing substantially such energy as would otherwise have been lost. Considerable quantities of reduction agent or fuel, as well as electrical energy, are saved by the fact that there is no need to burn limestone in the shaft or the reactor, in addition to which the slag former can be charged whilst hot.

Among metal sulphides which can be treated to advantage in accordance with the invention can be mentioned pyrite, pyrrhotite, chalcopyrite, galena or galenite, pentlandite, arsenopyrite, zincblende or certain mixtures of two or more of these sulphidic materials. When practising the method according to the invention, there can be produced in conjunction with certain metal sulphides, such as sulphides of lead or copper, a roasted product having a high content of metallic material. In practice, the amount of metal directly produced depends upon the permitted sulphur content of the finished, partially reduced product. When a low sulphur content is desired, a larger portion of the metal sulphide must be converted to metal oxide in the roasting zone.

BRIEF DESCRIPTION OF THE DRAWINGS

Exemplary embodiments of the invention will now be described in more detail with reference to the accompanying drawing, on which FIG. 1 diagrammatically shows a suitable plant for carrying out the method of the invention.

Figure 1:
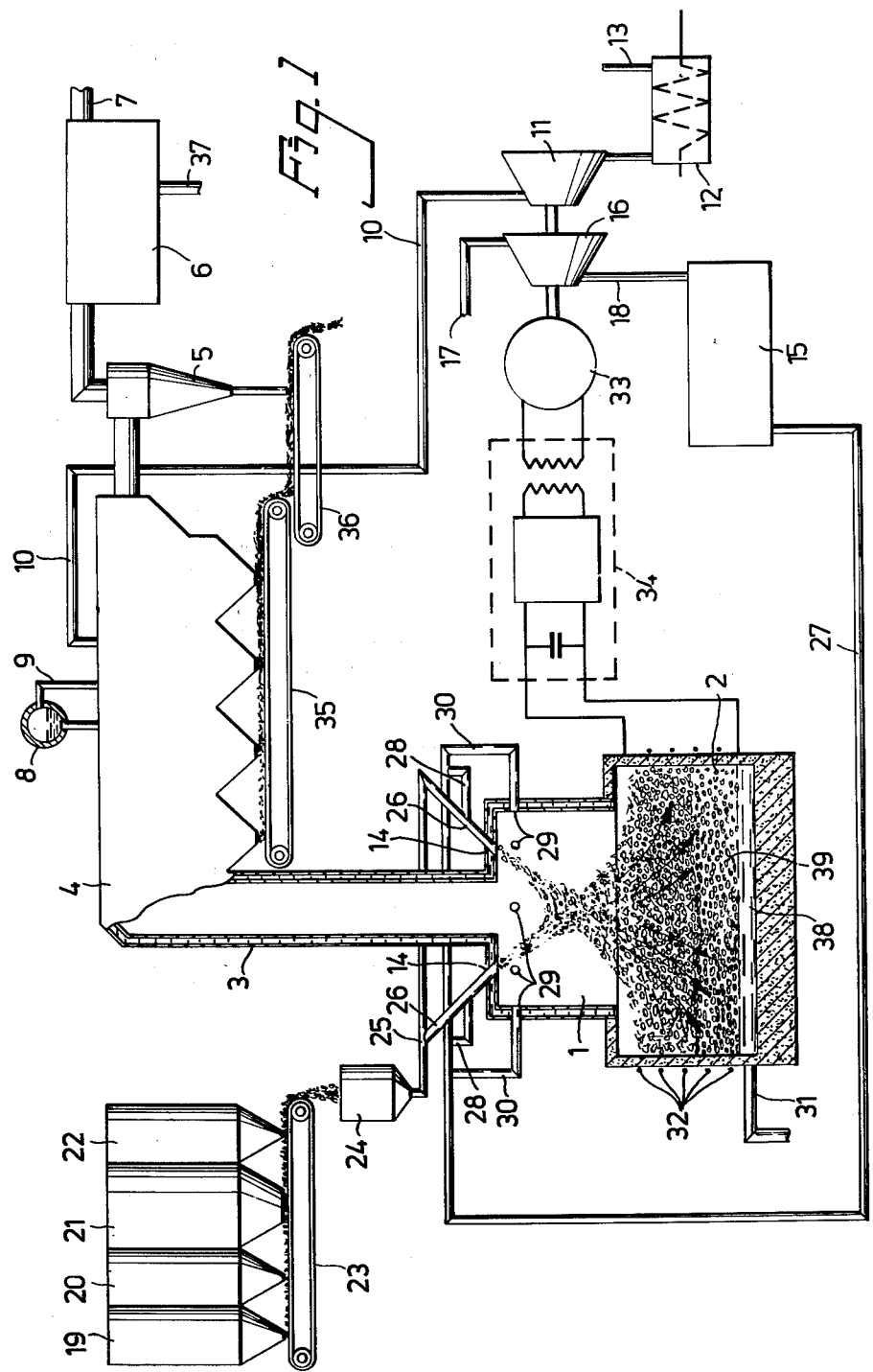

The plant shown in FIG. 1 is intended for the production of molten iron from finely divided iron oxide which may have been obtained by roasting pyrites in a fluidized bed and comprises a shaft or stack 1 in which iron oxide is melted and partially reduced. The lowermost portion of the shaft 1 passes directly into a reactor zone 2 in which the partially reduced iron oxide is finally reduced and melted to form molten iron.

The gases which are formed, together with a certain amount of dust and vapourized or gasified components of the charged materials, leave the upper portion of the shaft 1 through an exhaust duct 3 which passes to means 4, 5, 6 for cleaning said gases and for recovering the heat content thereof. These means comprise a steam boiler 4, a cyclone arrangement 5 and a gas-cleaning device 6 which is constructed, for example for wet gas-cleaning and from which the cleaned gases, the major portion of the heat content of which is removed, exit through a duct 7 to a flue stack. At least the upper portion of the shaft 1, and similarly also the exhaust-gas duct, is constructed of metal tubes through which water is circulated whilst boiling. The exhaust-gas duct 3 is conveniently provided with means for cleaning the tube-lined walls from deposits. On the other hand, it is endeavoured to provide a protective coating of iron oxide material frozen onto the shaft walls lined with tubes, which walls may, to advantage, be provided with pegs or studs welded thereto, said pegs or studs facilitating freezing of molten material onto said walls. The steam formed in the tubes is separated together with the steam formed in the steam boiler 4 in a steam boiler dome 8, from which dome the separated steam is passed through ducts 9 and 10 to a condensor turbine 11 via a not shown superheated portion forming part of the boiler 4. The steam passing through the turbine 11 is condensed in a cooler 12, the condensate formed in the cooler and departing therefrom through a duct 13 can be returned to the boiler 4. Where low-pressure steam or hot water is of any use the turbine 11 may, to advantage, be replaced with a counter-pressure turbine.

Arranged in the roof of the shaft 1 is a ring of burners 14 for charging to the shaft 1 finely-divided iron oxide; finely-divided coal or some other carbonaceous or carbon containing reduction agent; finely-divided limestone and/or other slag formers or flux; return dust from the steam boiler 4 and the cyclone arrangement 5; and oxygen gas or some other gas intended for maintaining the combustion process, e.g. such as air or air enriched with oxygen. With the illustrated embodiment, oxygen gas is supplied to the burners 14, this oxygen gas being formed in an oxygen-gas manufacturing plant 15 which is supplied with compressed air from a compressor 16 driven by the turbine 11. The air inlet and outlet ducts of the compressor 16 are designated 17 and 18, respectively.

The iron oxide, coal, lime and return dust are stored in bunkers 19–22, from which they are removed in suitable proportions and charged to a mixing and equalizing bunker 24 by means of a conveyor belt 23. This mixture of materials is fed from the bunker 24 to the burners 14 through ducts 25, 26. The oxygen gas is supplied to the burners through ducts 27 and 28, of which the latter discharges into the ducts 26.

The burners 14, of which only two are shown in FIG. 1, are directed obliquely downwardly and tangentially to an imaginary circle at the bottom of the shaft 1. The diameter of this imaginary circle is approximately one quarter of the diameter of the shaft and the positioning and angle of inclination of the burners is such that the material discharged therefrom strikes the periphery of the imaginary circle at regions disposed symmetrically thereround. Additional oxygen gas for the final combustion of the material is supplied to the upper portion of the shaft 1 through substantially horizontal nozzles 29 which are supplied from the duct 27 through ducts 30 branching therefrom. The nozzles 29 are directed to a certain extent tangentially, suitably so that the streams of oxygen gas emitted therefrom are tangential to an imaginary circle whose diameter is approximately one third of the diameter of the shaft.

During its passage from the burners 14 down through the shaft 1, the iron oxide is melted and partially reduced, and the coal is converted to coke and the limestone burnt. The return dust, which comprises mainly iron oxide, is also melted and partially reduced. The molten and partially reduced iron oxide together with coke and burnt lime reaches the upper surface of the material bed of the reactor zone located in the bottom of the shaft and in the upper region of said material bed the molten iron oxide reacts with the coke to effect further partial reduction of the iron oxide and cooling. The material forming the bed then assumes a semi-liquid consistency or a dough-like consistency.

The iron oxide material is finally reduced and melted in the reactor zone 2 with the further consumption of coke, wherewith molten iron is formed and collects together with molten slag in the bottom portion of the reactor zone. Molten iron and slag are removed either continuously or intermittently from said bottom portion through a suitable tapping-off arrangement 31. The amount of coal charged is suitably selected so that there is maintained suspended on the bath of iron and slag 38 a bed of coke 39. During its passage through the coke bed 39, the molten slag is imparted a low iron content, silicon is formed by reduction and the formed molten iron is carburized.

The energy required to melt and finally reduce the iron oxide is supplied to the reactor zone 2 by electro-inductively heating the material therein. To this end there is arranged around the reactor zone 2 an induction coil 32 which is supplied with a.c. current from a generator 33 through a converter generally shown at 34.

With such inductive heating, the energy developed per unit of volume of the bed material increases from the centre of the reactor zone out towards the periphery thereof. Consequently, the material charged to the bed will move obliquely downwardly and outwardly during the continued reduction of the iron oxide and whilst melting, as indicated by arrows in FIG. 1.

Dust comprising mainly iron oxide is separated in the boiler 4 and the cyclone arrangement 5. This dust is removed on conveyor belts 35 and 36 and is passed by means of arrangements not shown to that one of the bunkers 19–22 which is used to store return dust. Metals removed from the material during process, such as lead and zinc in the form of fine-grain oxides and arsenic trioxide in vapour form, are caused to pass through the steam boiler 4 and the cyclone arrangement 5 and are separated in solid form in the gas cleaning means 6. The dust precipitating in the gas cleaning means 6 is removed through a duct 37 for separate treatment and thus is not returned to any of the bunkers 19–22.

The steam generated in the shaft 1, the exhaust gas duct 3 and the steam boiler 4 is used for operating the turbine 11, which in addition to the compressor 16, also drives the generator 33.

By adjusting the supply of combustible material, the energy developed in the flash smelting shaft 1 can advantageously be adjusted so that the amount of steam generated is sufficient to cover the total energy required for melting and reduction and for operating the oxygen-gas manufacturing equipment 15.

With a plant of the aforedescribed type having a capacity of 30 tons of molten iron per hour, the whole process requires about 590 kg of per ton of iron with a heat value with respect to the coal of 26.4 GJ/ton (6.3 Gcal/ton), wherewith the process becomes self-supporting with regard to the energy required for the melting, and reduction of the iron-oxides and the manufacture of oxygen gas at normal degrees of efficiency in the different energy conversion stages, such as in the steam boiler, the turbine, the generator, the converter etc. Thus, the process has a primary energy requirement in the form of coal of only 15.6 GJ (3.7 Gcal) per ton of iron. By way of comparison it can be mentioned that the requirement of primary energy for the conventional blast furnace process is 18.2 GJ/ton (4.35 Gcal/ton) including the manufacture of coke. Furthermore, with the method according to the invention, the coal used may be of a much poorer quality than the coal used for the manufacture of blast furnace coke.

Figure 2:
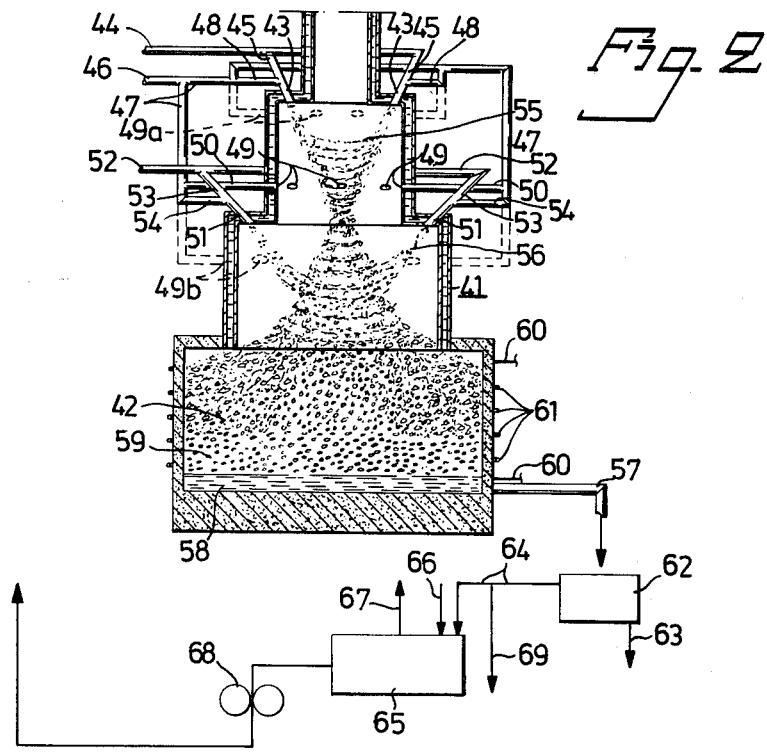
FIGS. 2 and 3 diagrammatically show two embodiments of modified shaft constructions which can be used to advantage in conjunction with the method according to the invention.

The shaft 41 shown in FIG. 2 and having an upper and a lower zone 55 and 56 respectively is assumed to form part of a plant of the general type illustrated and described in FIG. 1, but which has been modified for the production of molten iron from finely divided pyrite concentrates. The lowermost portion of the shaft 41 merges directly with a reactor zone 42, in which partially reduced iron oxide is finally reduced and melted to form molten iron.

Arranged in the roof of the shaft 41 is a ring of burners 43, through which burners there is dispensed to the shaft finely divided concentrates, finely divided lime and/or other slag formers or flux, return dust and oxygen gas or some other gas, such as air to air enriched in oxygen, for maintaining the combustion or roasting process. In the illustrated embodiment, the solid material is passed to the burners 43 through ducts 44, 45, and oxygen gas through a duct 46 and ducts 47 and 48 branching from said duct 46. The burners 43, of which only two are shown in the drawing, are directed obliquely downwards and tangential to an imaginary circle, the diameter of which is smaller than the smallest cross-dimension of the shaft, so that there will be obtained a vortex movement in the shaft. Oxygen gas is also supplied to the shaft 41 through horizontal nozzles 49, which are supplied from ducts 47 via ducts 50 branching from said ducts 47 and directed, to a certain extent, tangentially so as to support the vortex movement created by the nozzles 43. As indicated at 49a and 49b respectively, additional nozzles for supplying oxygen gas to desired levels of the zone 55 and/or the zone 56 can be provided, these nozzles being supplied from the ducts 47, as shown. The nozzles 51 are arranged in substantially the same manner as the burners 43, and solid carbonaceous or carbon-containing reduction agent is supplied to the shaft through said nozzles, which are supplied from ducts 52 and 53, the reduction agent being converted to coke at the temperature prevailing in the shaft. When the illustrated embodiment, the carrier gas for the reduction agent is oxygen gas, which is supplied to the nozzles 51 through ducts 54 branching from the ducts 47.

During their passage from the burners 43 down through the zone 55 of the shaft 41 the concentrates are roasted and return dust and roasted products are melted. During the continued passage of these products through the zone 56 of the shaft, the iron oxide and the return dust are partially reduced to a certain extent. The molten and partially reduced iron oxide, together with coke formed from the reduction agent and burnt lime fall upon the upper surface of the bed of material present in the bottom of the shaft 41 and the reactor zone 42, and the molten iron oxide will react in the upper region of the bed with the coke whilst being further reduced and simultaneously cooled. The material in the bed then assumes a semi-liquid or doughy consistency.

The iron oxide material is finally reduced and melted in the reactor zone 42, with the comsumption of further coke, whereupon molten iron is formed and molten slag is collected in the bottom portion of the reactor zone. During the reduction process, carbon monoxide containing gases are formed which pass upwardly through the shaft together with the gases formed during the coking operation. These gases are partially oxidized by reaction with the molten metal oxide containing material in the zone 56 and are finally combusted with the oxygen gas passed through the nozzles 49 or optionally the nozzles 49a. Molten iron and slag are discharged from the bottom portion of the reactor zone either continuously or intermittently, through a suitable tapping device 57. The amount of reduction agent charged to the shaft is conveniently selected so that a bed of coke 59 is held suspended on the bath 58 of iron and slag. During its passage through the bed of coke 59, the molten slag is imparted a low percentage of iron, silicon is formed by reduction and the molten iron is carburized.

The energy required for the melting operation and the final reduction of the partially reduced iron oxide is supplied to the reactor zone 42 by electro-inductive heating of the material therein. To this end an induction coil 61 is arranged around the reactor zone 42, said coil being supplied with a.c. current via electrical conductors 60.

As illustrated, part of the physical heat content of the tapped slag can be recovered, to advantage, by using said heat for burning limestone, which subsequently used as a slag former in the process. To this end, iron and slag is passed from the tapping device 57 to a slag separating device 62, from which molten iron and molten slag are discharged along separate paths, as indicated by the arrows 63 and 64, respectively. Part of the slag is passed to a vessel 65 in which it is contacted with material containing limestone which is charged to the vessel 65 through an inlet 66. The limestone is then burnt and the slag solidifies, carbon dioxide being formed and discharged through an outlet 67, while the hot mixture of slag and burnt lime is ground in a grinding apparatus 68 to suitable particle size and then charged to the shaft, conveniently whilst hot, either via a bunker for storing slag former or directly to the burners 43. Remaining slag not used for burning the limestone is discharged at 69.

Figure 3:
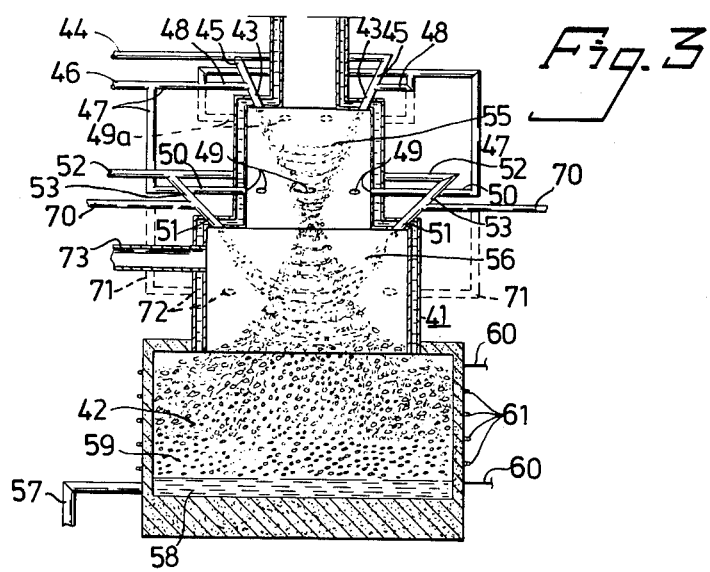

The embodiment according to FIG. 3 will now be described in more detail, although it will be noted that only those parts of said embodiment which differ from the FIG. 2 embodiment will be described, coinciding or substantially coinciding elements in FIGS. 2 and 3 being identified by the same reference numerals. With the FIG. 3 embodiment, there is desired from the roasting zone 55 a gas which is relatively rich in sulphur, more specifically a gas from which sulphur in elementary form can be recovered in accordance, for example, with a Claus-process. Consequently, there is required a roaster gas which contains both $H_2S$ and $SO_2$, which in the Claus-process react with each other to form $H_2O$ and S. To this end there is used a mixture of water vapour and oxygen gas as carrier gas for the material supplied through the burners 43; such a mixture is also charged through the nozzles 49. When nozzles 49a are arranged at the uppper portion of the zone 55, these nozzles can be supplied with a gas which is richer in steam than the gas charged through the nozzles 49. The carrier gas used for the reduction agent charged through the ducts 52 and 53 comprises substantially solely oxygen, which is supplied via ducts 70, from which ducts 71 for supplying the nozzles 72 may branch. The latter nozzles may be arranged in substantially the same manner as the nozzles 49b of the FIG. 2 embodiment and serve to at least partially combust combustible gas in the upper portion of the shaft zone 56. The combusted gas is taken out of the zone 56 through an outlet duct 73, so as to prevent dilution of the roaster gas. The residual heat content of the removed gas can be recovered in a steam boiler in the same manner as that illustrated for the gases departing from the shaft in the embodiment shown and described with reference to FIG. 1.

Finally, it can be mentioned that owing to the simplicity of the apparatus required when practising the method according to the invention and the fact that the plant does not require the provision of a coke-manufacturing plant and a sintering plant and optionally even a separate roaster plant, the investment costs are considerably lower than those incurred with a conventional blast furnace process, even with comparatively small units calculated per ton capacity.

The invention will now be further illustrated with reference to a number of Examples.

EXAMPLE 1

45 tons of oxidic iron ore concentrate are charged continuously each hour to a plant generally of the type described with reference to FIG. 1 but with no reactor connected to the shaft, said concentrate containing 65.5 % by weight iron having an oxidatior degree of 95 % (95 % by weight of Fe was oxidized to $Fe_2O_3$); 6.9 tons of limestone and 19 tons of stone-coal containing 6 % by weight moisture and 20 % by weight ash. An oxygen containing gas is charged to the shaft continuously at a rate of 15,800 $Nm^3/h$ (calculated as 100 % $O_2$). During its fall through the shaft, the ore concentrate is melted and partially reduced, whereafter it is contacted with a reductant charged to the bed at the lower portion of the shaft and there further reduced, the molten ore concentrate being cooled during the reduction process. The temperature of the molten material, which has been partially reduced to substantially FeO, when it reaches the surface of the bed at the lower portion of the shaft is approximately 1500° C, where it is cooled down to approximately 1000° C during said continued reduction process. At the same time, 41.7 tons of sinter are discharged from the bottom of the saft with the aid of a cooled discharge device. The sinter contains 69 % by weight Fe having an oxidation degree of approximately 10 %, and 4 % by weight carbon. The temperature of the waste gases leaving the shaft is 1750° C and the gases are charged to a steam boiler where, over a period of 1 hour, high-pressure steam having an energy content of 55 MWh is produced. The steam is used to drive a steam turbine, which delivered 18 MWh per hour in the form of electrical energy, of which 5.8 MWh is used in the oxygen gas apparatus associated with the plant and the remaining 12.2 MWh are delivered to the mains as electrical energy.

EXAMPLE 2

Iron ore concentrate, limestone and stone-coal of the same grades as those recited in Example 1 are fed in the same hourly quantities to the furnace disclosed in Example 1, although in this case an electro-inductively heated furnace for smelting and finally reducing the material is connected to the lower portion of the shaft, as described with reference to FIG. 1. The amount of oxygen gas supplied to the furnace is increased slightly to 16,700 $Nm^3/h$.

The sinter formed is subsequently melted down in the inductively heated reactor. In this instance, the final products comprise molten curde-iron and slag. Over a period of 1 hour, 30 tons of crude-iron having a carbon content of 2.5 % by weight and a silicon content of <1 % by weight, and 9.9 tons of slag are tapped off at a temperature of approximately 1450° C. The waste gases from the shaft has a temperature of approximately 1930° C and are charged to the steam-boiler, where high-pressure steam having an energy content of 58 MWh is produced. Over the same period of time, the steam-turbine produces, with the aid of the high-pressure steam, 20.3 MWh of electrical energy, of which 6.2 MWh are used to operate the oxygen gas apparatus, 11.1 MWh for inductively heating the reactor and 3.0 MWh in the operation of auxiliary plant equipment.

EXAMPLE 3

In this case there is used a plant of the type described in FIG. 2, for the production of lead from lead sulphide. The capacity of the plant is approximately 15 tons of lead per hour. 20,440 kg of lead sulphide concentrate having 75 % by weight lead are charged continuously each hour to the roasting zone of the shaft. Also charged to the furnace over the same period of time are 1500 kg of limestone, 310 kg of coke, 170 kg of heavy firing-oil, and 6000 kg of return dust substantially in the form of lead sulphates. The oxygen requirement is 3000 Nm$^3$/h, calculated as 100 % O$_2$.

The flame-smelted and partially reduced material, of whose lead content, 30 % by weight is oxidized to PbO, has a temperature of 1200° when it reaches the inductively heated reactor connected to the lower portion of the shaft. Each hour there are tapped off from the reactor, 15000 kg of molten lead at a temperature of 800° C, and 2700 kg of slag at a temperature of 1250° C. 4100 Nm$^3$ of gas having a temperature of 1200° C are removed hourly from the shaft. The gas contains 52 % by volume SO$_2$ and 4400 kg of dust in the form of PbO, said dust being sulphatized by SO$_2$ in the gas and separated in the steam boiler and gas purification apparatus, whereafter it is returned to the shaft as lead-sulphate containing return-dust. Over a period of 1 hour high-pressure steam having an energy content of 2100 kW is produced in the steam boiler, said steam being used to drive a steam turbine which delivers 690 kW/h of electrical energy, of which 130 kW/h is used for manufacturing oxygen gas and 560 kW/h for operating the reactor.

The invention is not restricted to the described and illustrated embodiments, but can be modified within the scope of the inventive idea.

We claim:

1. A method of producing from finely divided metal oxide containing material, selected from the group comprising ore concentrates with oxidic intermediate products, a partially reduced product, which is suited for final reduction, said method comprising the steps of introducing the finely divided metal oxide containing material and a finely divided solid carbonaceous reduction agent into a shaft at a distance from the lower portion thereof, contacting the metal oxide containing material and the reduction agent, while falling downwardly through the shaft, with hot combustion gases passing substantially upwardly through the shaft to melt said material and heat said agent and also to subject said material to an initial reduction by means of chemical reactions between said material, said agent and any reducing components of said combustion gases, collecting the molten and initial reduced metal oxide material and remaining solid parts of the reduction agent in the lower portion of the shaft to cause continued heat requiring reduction of said material in direct contact with said parts of the reduction agent, thereby forming a substantially solid product comprising partially reduced oxide material and solid carbon material.

2. A method according to claim 1, wherein at least part of the metal oxide containing material is produced by roasting finely-divided metal sulphide containing material in a roasting zone in the shaft located above the portion thereof in which the metal oxide containing material is partially reduced.

3. A method according to claim 1, wherein the carbonaceous or carbon containing reduction agent comprises an organic product which is converted to coke in the shaft whilst giving off combustible gases.

4. A method according to claim 2, wherein the carbonaceous or carbon containing reduction agent is charged to the shaft below the roasting zone.

5. A method according to claim 1, wherein said material and/or the carbonaceous or carbon containing reduction agent is charged to the shaft through nozzles which are directed so as to create a vortex movement about a substantially vertical axis.

6. A method according to claim 2, wherein roasting is effected in the presence of water vapour.

7. A method according to claim 1, wherein the hot gases for melting the metal oxide containing material is generated by the partial combustion of the carbonaceous or carbon containing reduction agent.

8. A method according to claim 1, wherein the hot gases are generated by combusting fuel and/or reduction agent with a gas containing 20-100% by volume free oxygen.

9. A method according to claim 8, wherein said oxygen containing gas is pre-heated.

10. A method according to claim 1, wherein reducing gas formed with the partial reduction of the metal oxide containing material is combusted by supplying oxidizing gas to the shaft.

11. A method according to claim 1, wherein oxidizing gas supplied to the shaft is distributed over the height of the shaft in a manner such that conditions which are more oxidizing are obtained in the upper portion of the shaft and conditions which are more reducing are obtained in the lower portion of said shaft, the metal oxide containing material being partially reduced to a certain extend during its fall through the shaft.

12. A method according to claim 11, wherein reduction agent and any fuel together with part of the oxidizing gas are supplied to the lower portion of the shaft, said part being adjusted so as to create reducing conditions in this portion of said shaft.

13. A method according to claim 2, wherein oxidizing gas is supplied to the shaft at said roasting zone.

14. A method according to claim 7, wherein said combustion is effected at least substantially beneath the roasting zone.

15. A method according to claim 14, wherein the major portion of the combusted gas is removed from the shaft beneath the roasting zone.

16. A method according to claim 1, wherein oxidizing gas is charged to the shaft through nozzles which are so directed as to create a vortex movement about a substantially vertical axis.

17. A method according to claim 16, wherein said nozzles for the oxidizing gas are directed obliquely donwardly.

18. A method according to claim 1, wherein said material and/or the carbonaceous or carbon containing material is injected to the shaft utilizing oxidizing gas as a carrier gas.

19. A method according to claim 1, wherein the amount of carbon material in the partially reduced product is adapted so that it is at least sufficient for the final reduction of the metal oxide contained in said product.

20. A method according to claim 1, wherein the partially reduced, solid carbon material containing product is finally reduced and melted in a reactor adjoining the lower portion of the shaft.

21. A method according to claim 20, wherein energy required for the final reduction and melting stages is supplied to the reactor electroinductively.

22. A method according to claim 20, wherein energy required for the final reduction and melting stages is supplied to the reactor by burning excess carbon in the partially reduced product.

23. A method according to claim 20, wherein energy for the final reduction and melting stages is obtained by supplying solid, liquid or gaseous fuel and oxygen-containing blast to the reactor.

24. A method according to claim 20, wherein a lime containing slag former is charged during the reduction process and formed metal and molten slag are tapped from the reactor, and wherein the slag former is produced from a portion of the tapped molten slag and unburnt limestone containing solid material, which material is burnt at least partially by contacting the same with said portion of said slag.

* * * * *